(12) United States Patent
Despotopoulou et al.

(10) Patent No.: US 10,800,881 B2
(45) Date of Patent: Oct. 13, 2020

(54) HIGH MODULUS CURABLE COMPOSITION

(71) Applicant: Henkel AG & Co. KGaA, Duesseldorf (DE)

(72) Inventors: Christina Despotopoulou, Minneapolis, MN (US); Jan-Erik Damke, Duesseldorf (DE); Markus Bonigut, Hilden (DE); Johann Klein, Duesseldorf (DE)

(73) Assignee: Henkel AG & Co. KGaA, Duesseldorf (DE)

(*) Notice: Subject to any disclaimer, the term of this patent is extended or adjusted under 35 U.S.C. 154(b) by 0 days.

(21) Appl. No.: 16/207,447

(22) Filed: Dec. 3, 2018

(65) Prior Publication Data
US 2019/0100618 A1    Apr. 4, 2019

Related U.S. Application Data

(63) Continuation of application No. PCT/EP2017/064065, filed on Jun. 9, 2017.

(30) Foreign Application Priority Data

Jun. 13, 2016  (EP) .................................... 16174116

(51) Int. Cl.
| | |
|---|---|
| *C08L 83/06* | (2006.01) |
| *C08G 65/336* | (2006.01) |
| *C08G 65/08* | (2006.01) |
| *C08J 3/24* | (2006.01) |
| *C09K 3/10* | (2006.01) |
| *C09D 171/02* | (2006.01) |
| *C09J 171/02* | (2006.01) |
| *C08K 5/5419* | (2006.01) |
| *C08L 71/02* | (2006.01) |

(52) U.S. Cl.
CPC ........... *C08G 65/336* (2013.01); *C08G 65/08* (2013.01); *C08J 3/24* (2013.01); *C08K 5/5419* (2013.01); *C09D 171/02* (2013.01); *C09J 171/02* (2013.01); *C09K 3/1018* (2013.01); *C08G 2150/00* (2013.01); *C08G 2170/00* (2013.01); *C08G 2190/00* (2013.01); *C08L 71/02* (2013.01); *C08L 83/06* (2013.01)

(58) Field of Classification Search
CPC ........ C08L 71/02; C08L 83/06; C09D 171/02
USPC ......................................................... 528/43
See application file for complete search history.

(56) References Cited

U.S. PATENT DOCUMENTS

| | | | |
|---|---|---|---|
| 4,111,890 A * | 9/1978 | Getson ..................... | C08K 5/54 528/10 |
| 7,015,297 B2 | 3/2006 | Schindler et al. | |
| 7,319,128 B2 | 1/2008 | Ziche et al. | |
| 7,652,119 B2 | 1/2010 | Wakabayashi et al. | |
| 8,513,352 B2 | 8/2013 | Kohl et al. | |
| 8,563,675 B2 | 10/2013 | Zander et al. | |
| 8,772,421 B2 | 7/2014 | Bachon et al. | |
| 9,309,437 B2 | 4/2016 | Stanjek et al. | |
| 2011/0232825 A1 | 9/2011 | Mack et al. | |
| 2012/0059130 A1 | 3/2012 | Neuhausen et al. | |
| 2012/0123016 A1* | 5/2012 | Bolte ..................... | C09J 171/02 523/122 |

FOREIGN PATENT DOCUMENTS

| | | |
|---|---|---|
| CN | 1629212 A | 6/2005 |
| CN | 101056946 A | 10/2007 |

(Continued)

OTHER PUBLICATIONS

International Search Report for International PCT Patent Application No. PCT/EP2017/064065 dated Jun. 30, 2017.

*Primary Examiner* — Margaret G Moore
(74) *Attorney, Agent, or Firm* — James E. Piotrowski

(57) ABSTRACT

The invention relates to a curable composition comprising a) at least one polymer having at least one terminal group of the general formula (I)

$$-A_n-R-SiXYZ \qquad (I),$$

wherein A is a divalent bonding group containing at least one heteroatom, R is selected from divalent hydrocarbon residues having 1 to 12 carbon atoms, X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy or $C_1$ to $C_8$ acyloxy groups, and n is 0 or 1; and b) at least one compound of the general formula (II)

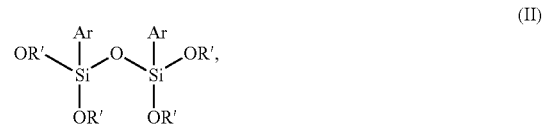

wherein R' is same or different and is, independently from one another, selected from the group consisting of a hydrogen atom and hydrocarbon residues having 1 to 12 carbon atoms, and Ar is selected from aryl groups, and adhesive, sealant, or coating materials comprising the composition and use thereof.

13 Claims, No Drawings

(56) References Cited

FOREIGN PATENT DOCUMENTS

| | | |
|---|---|---|
| CN | 101778885 A | 7/2010 |
| CN | 102741347 A | 10/2012 |
| CN | 102869734 A | 1/2013 |
| DE | 102008032580 A1 | 1/2010 |
| DE | 102010002808 A1 | 9/2011 |
| EP | 1396513 A1 | 3/2004 |
| EP | 1535940 A1 | 6/2005 |
| EP | 1930376 A1 | 6/2008 |
| WO | 2005047394 A1 | 5/2005 |
| WO | 2010063740 A1 | 6/2010 |

\* cited by examiner

HIGH MODULUS CURABLE COMPOSITION

The present invention relates to the field of curable compositions, as used for example in adhesives, sealants and coating compositions. In particular, the invention relates to moisture curable compositions based on silane-terminated polymers, their use as an adhesive, sealant and/or coating material, and adhesive, sealant and/or coating materials comprising the moisture curable composition.

One-component, moisture-curing adhesives and sealants have for years played an important part in numerous technical applications. As well as the polyurethane adhesives and sealants with free isocyanate groups and the traditional silicone adhesives and sealants based on dimethylpolysiloxanes, there has recently also been increasing use of so-called silane-terminated adhesives and sealants. Compared with polyurethane adhesives and sealants, the silane-terminated adhesives and sealants have the advantage that they are free from isocyanate groups, in particular from monomeric diisocyanates. Furthermore, they are distinguished by a broad range of adhesion to a wide variety of substrates without any surface pretreatment using primers.

Polymer systems having reactive silyl groups are therefore known in principle. In the presence of atmospheric moisture, polymers having silyl groups with hydrolyzable substituents are already capable of condensing with one another at room temperature, splitting off the hydrolyzed residues. Depending on the concentration of silyl groups having hydrolyzable substituents and the structure of these silyl groups, mainly long-chain polymers (thermoplastics), relatively wide-mesh, three-dimensional networks (elastomers) or highly crosslinked systems (thermosets) are formed during this process. The polymers generally comprise an organic backbone which carries, for example, alkoxysilyl or acyloxysilyl groups at the ends. The organic backbone can be, for example, polyurethanes, polyesters, polyethers, etc.

Polymers with silyl groups at the ends or in a side chain are described for example in EP 1 396 513 A1. The silyl groups having hydrolyzable substituents are introduced, according to this document, by addition of a hydrosilane to terminal double bonds of the backbone polymer, by reaction of isocyanatosilanes with hydroxyl groups of the polymer, by reaction of silanes comprising active hydrogen atoms with isocyanate-functionalized polymers or by reaction of mercaptosilanes with terminal double bonds of the polymer. The polymers are a component of compositions which are used as adhesives or sealants.

EP 1 535 940 A1 also describes a method for producing crosslinkable materials, wherein in a first step organyloxysilyl-terminated polymers are produced by reacting dihydroxy-terminated polymers with isocyanato-functional silanes and these are mixed in a second step with silane condensation catalyst and optionally further substances.

A curable composition based on silyl groups which can crosslink by siloxane bond formation is also provided by EP 1 930 376 A1, wherein an amine compound constituting a silanol condensation catalyst is listed as a further component.

A crosslinkable polymeric composition based on silane-terminated polymers having mixed oxyalkylene units in the polymer backbone is described in WO 2005/047394 A1.

WO 2010/063740 A1 discloses an adhesive or sealant comprising silylated polyurethanes, silylated polyureas, silylated polyethers, silylated polysulfides and silyl-terminated acrylates, as well as a cyclohexanepolycarboxylic acid derivative.

A need still exists for compositions based on the silane-terminated polymers for use in adhesives, sealants and coatings that exhibit improved performance, in particular, mechanical properties after curing. In addition, the compositions should also meet all other conventional requirements of a modern adhesive, sealant and/or coating composition.

The object of the present invention is therefore to provide a curable composition having improved mechanical properties, in particular having high modulus and elongation.

It has been found surprisingly that this object is achieved by the use of a specific combination of certain silicone compound(s) in a composition based on silane-terminated polymers. The invention therefore provides a curable composition, which at least comprises a) at least one polymer having at least one terminal group of the general formula (I)

wherein

A is a divalent bonding group containing at least one heteroatom, R is selected from divalent hydrocarbon residues having 1 to 12 carbon atoms, X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound and at least one of the substituents X, Y, Z is selected from the group consisting of a hydroxyl group, $C_1$ to $C_8$ alkoxy and $C_1$ to $C_8$ acyloxy groups, and n is 0 or 1; and b) at least one compound of the general formula (II)

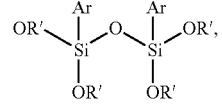

wherein R' is same or different and is, independently from one another, selected from the group consisting of a hydrogen atom and hydrocarbon residues having 1 to 12 carbon atoms, and Ar is selected from aryl groups.

A "composition" is understood in the context of the present invention as a mixture of at least two ingredients.

The term "curable" is to be understood to mean that, under the influence of external conditions, in particular under the influence of moisture present in the environment and/or supplied for the purpose, the composition can pass from a relatively flexible state, optionally possessing plastic ductility, to a harder state. In general, the crosslinking can take place by means of chemical and/or physical influences, i.e. as well as the already mentioned moisture, for example, by the supply of energy in the form of heat, light or other electromagnetic radiation, but also by simply bringing the composition into contact with air or a reactive component.

In preferred embodiments, the polymer a) has at least two terminal groups of the general formula (I).

The polymer having the at least one terminal group of the general formula (I) is preferably a polyether, a poly(meth)acrylic acid ester, or a polyurethane.

A "polyether" is understood to be a polymer in which the organic repeating units comprise ether functionalities C—O—C in the main chain. Polymers having lateral ether groups, such as cellulose ethers, starch ethers and vinyl ether polymers, as well as polyacetals such as polyoxymethylene (POM) are not included in the polyethers.

A "poly(meth)acrylic acid ester" is understood to be a polymer based on (meth)acrylic acid esters, which therefore has as a repeating unit the structural motif —$CH_2$—$CR^a$ ($COOR^b$)—, where $R^a$ denotes a hydrogen atom (acrylic acid ester) or a methyl group (methacrylic acid ester) and $R^b$ denotes linear alkyl residues, branched alkyl residues, cyclic alkyl residues and/or alkyl residues comprising functional substituents, for example methyl, ethyl, isopropyl, cyclohexyl, 2-ethylhexyl or 2-hydroxyethyl residues.

A "polyurethane" is understood to be a polymer which has at least two urethane groups —NH—CO—O— in the main chain.

The polymer having at least one terminal group of the general formula (I) is particularly preferably a polyether. Polyethers have a flexible and elastic structure, with which compositions having excellent elastic properties can be produced. Polyethers are not only flexible in their backbone, but at the same time strong. Thus, for example, polyethers are not attacked or decomposed by water and bacteria, in contrast to, e.g., polyesters, for example.

The number average molecular weight $M_n$ of the polyether on which the polymer is based is for preference 2000 to 100,000 g/mol (daltons), particularly preferably at least 6000 g/mol and in particular at least 8000 g/mol. Number average molecular weights of at least 2000 g/mol are advantageous for the polyethers of the present invention, because compositions according to the invention based on polyethers with such a minimum molecular weight have significant film-forming properties. For example, the number average molecular weight $M_n$ of the polyether is 4000 to 100,000, preferably 8000 to 50,000, particularly preferably 10,000 to 30,000 and in particular 10,000 to 25,000 g/mol. These molecular weights are particularly advantageous, since the corresponding compositions have a balanced ratio of viscosity (ease of processing), strength and elasticity.

Particularly advantageous viscoelastic properties can be achieved if polyethers having a narrow molecular weight distribution, and thus low polydispersity, are used. These can be produced, for example, by so-called double metal cyanide catalysis (DMC catalysis). Polyethers produced in this way are distinguished by a particularly narrow molecular weight distribution, by a high average molecular weight and by a very low number of double bonds at the ends of the polymer chains.

In a special embodiment of the present invention, the maximum polydispersity $M_w/M_n$ of the polyether on which the polymer is based is therefore 3, particularly preferably 1.7 and most particularly preferably 1.5.

The number average molecular weight $M_n$, as well as the weight average molecular weight $M_w$, is determined according to the present invention by gel permeation chromatography (GPC, also known as SEC) at 23° C. using a styrene standard. This method is known to one skilled in the art. The polydispersity is derived from the average molecular weights $M_w$ and $M_n$. It is calculated as PD=$M_w/M_n$.

The ratio $M_w/M_n$ (polydispersity) indicates the width of the molecular weight distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution, and thus the specific expression of properties associated with molecular weight, such as e.g., viscosity. In particular, therefore, in the context of the present invention, the polyether on which the polymer A is based has a polydispersity ($M_w/M_n$) of less than 1.3.

In preferred embodiments the polymer having at least one terminal group of the general formula (I) can be a polyurethane obtainable by reacting at least i) a polyol or a mixture of two or more polyols and ii) a polyisocyanate or a mixture of two or more polyisocyanates.

A "polyol" is understood to be a compound which contains at least two OH groups, irrespective or whether the compound contains other functional groups. However, a polyol used in accordance with the present invention preferably contains only OH groups as functional groups or, if other functional groups are present, none of these other functional groups is reactive at least to isocyanates under the conditions prevailing during the reaction of the polyol(s) and polyisocyante(s).

The polyols suitable for preparing the polyurethane according to the invention are preferably polyether polyol. The above descriptions about the molecular weight and polydispersity of the polyether apply to the polyether polyol. The polyether polyol is preferably a polyalkylene oxide, particularly preferably polyethylene oxide and/or polypropylene oxide. In preferred embodiments, a polyether or a mixture of two polyethers are used.

The polyols to be used in accordance with the invention have an OH value of preferably about 5 to about 15 and, more preferably, of about 10. The percentage content of primary OH groups should be below about 20%, based on all the OH groups, and is preferably below 15%. In one particularly advantageous embodiment, the acid value of the polyethers used is below about 0.1, preferably below 0.05 and, more preferably, below 0.02.

Besides the polyethers, the polyol mixture may contain other polyols. For example, it may contain polyester polyols with a molecular weight of about 200 to about 30,000.

A "polyisocyanate" is understood to be a compound which has at least two isocyanate groups —NCO. This compound does not have to be a polymer, and instead is frequently a low molecular compound.

The polyisocyanates suitable for preparing the polyurethane according to the invention include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), and the isomeric mixtures thereof. Also suitable are partially or completely hydrogenated cycloalkyl derivatives of MDI, for example completely hydrogenated MDI ($H_{12}$-MDI), alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bis-isocyanatoethyl ester, 1chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate, sulfur-containing diisocyanates such as those obtainable by reacting 2 moles diisocyanate with 1 mole thiodiglycol or dihydroxydihexyl sulfide, diisocyanates of dimer fatty acids, or mixtures of two or more of the named diisocyanates. The polyisocyanate is preferably IPDI, TDI or MDI.

Other polyisocyanates suitable for use in accordance with the invention are isocyanates with a functionality of three or more obtainable, for example, by oligomerization of diisocyanates, more particularly by oligomerization of the isocyanates mentioned above. Examples of such tri- and higher isocyanates are the triisocyanurates of HDI or IPDI or mixtures thereof or mixed triisocyanurates thereof and polyphenyl methylene polyisocyanate obtainable by phosgenation of aniline/formaldehyde condensates.

According to the invention, there is preferably a stoichiometric excess of NCO groups of the polyisocyanates with respect to the hydroxy groups of the polyols, "the polyols" and "the polyisocyanates" in each case also encompassing the presence of only one polyol and/or only one polyisocyanate. This stoichiometric excess must exist under the process conditions; i.e., it is not sufficient when the excess is nominally present, but a portion of the NCO groups of the polyisocyanates reacts with reactants other than the OH groups of the polyols, for example with monofunctional alcohols, so that there is a de facto shortage of NCO groups of the polyisocyanates with respect to the OH groups of the polyols. The ratio of the number of OH groups of the polyols to the number of NCO groups of the polyisocyanates is particularly preferably 1:3 to 1:1.1, in particular 1:2.5 to 1:1.5.

The at least one polymer of the curable composition according to the invention has at least one terminal group of the general formula (I)

$$-A_n-R-SiXYZ \qquad (I),$$

wherein A is a divalent bonding group containing at least one heteroatom, R is selected from divalent hydrocarbon residues having 1 to 12 carbon atoms, X, Y, Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting a hydroxyl group, $C_1$ to $C_8$ alkoxy and $C_1$ to $C_8$ acyloxy groups, and n is 0 or 1.

In this context, the divalent bonding group A comprising at least one heteroatom is understood to be a divalent chemical group which links the polymer backbone of the silane-terminated polymer with the residue R of the formula (I). For example, the divalent linking group A can be formed for example during the production of the alkoxysilane- and/or acyloxysilane-terminated polymer, for example as an amide or urethane group by the reaction of a polyether which is functionalized with hydroxy groups with an isocyanatosilane. The divalent linking group can be either capable or incapable of being differentiated from structural features occurring in the underlying polymer backbone. The latter is the case, for example, if it is identical with the linking points of the repeating units of the polymer backbone.

The index "n" corresponds to 0 (zero) or 1, i.e. the divalent linking group A links the polymer backbone with the residue R (n=1) or the polymer backbone is bound or linked directly with the residue R (n=0).

The divalent linking group A in the general formula (I) is preferably an oxygen atom or an —NR"-group, where R" is selected from the group consisting of a hydrogen atom, and alkyl or aryl residues having 1 to 12 carbon atoms, or is a substituted or unsubstituted amide, carbamate, urethane, urea, amino, carboxylate, carbamoyl, amidino, carbonate, sulfonate or sulfinate group. Particularly preferred as linking group A are urethane and urea groups, which can be obtained by reacting certain functional groups of a prepolymer with an organosilane which carries a further functional group. Urethane groups can be formed, for example, either when the polymer backbone comprises terminal hydroxy groups and isocyanatosilanes are used as a further component, or conversely when a polymer having terminal isocyanate groups is reacted with an alkoxysilane comprising terminal hydroxy groups. Similarly, urea groups can be obtained if a terminal primary or secondary amino group—either on the silane or on the polymer—is used, which reacts with a terminal isocyanate group that is present in the respective reactant. This means that either an aminosilane is reacted with a polymer having terminal isocyanate groups or a polymer that is terminally substituted with an amino group is reacted with an isocyanatosilane.

Urethane and urea groups advantageously increase the strength of the polymer chains and of the overall crosslinked polymer.

The residue R is a divalent hydrocarbon residue having 1 to 12 carbon atoms. The hydrocarbon residue can be a linear, branched or cyclic alkylene residue. The hydrocarbon residue can be saturated or unsaturated. R is preferably a divalent hydrocarbon residue having 1 to 6 carbon atoms. The curing rate of the composition can be influenced by the length of the hydrocarbon residues which form one of the binding links or the binding link between polymer backbone and silyl residue. Particularly preferably, R is a methylene, ethylene or n-propylene group, in particular a methylene or n-propylene residue.

Alkoxysilane-terminated compounds having a methylene group as binding link to the polymer backbone—so-called "alpha-silanes"—have a particularly high reactivity of the terminating silyl group, leading to reduced setting times and thus to very rapid curing of formulations based on these polymers.

In general, a lengthening of the binding hydrocarbon chain leads to reduced reactivity of the polymers. In particular, "gamma-silanes"—which comprise the unbranched propylene residue as binding link—have a balanced ratio between necessary reactivity (acceptable curing times) and delayed curing (open assembly time, possibility of corrections after bonding). By carefully combining alpha- and gamma-alkoxysilane-terminated building blocks, therefore, the curing rate of the systems can be influenced as desired.

Within the context of the present invention, R is most particularly preferably an n-propylene group.

The substituents X, Y and Z are, independently of one another, selected from the group consisting of a hydroxyl group and $C_1$ to $C_8$ alkyl, $C_1$ to $C_8$ alkoxy, and $C_1$ to $C_8$ acyloxy groups, wherein at least one of the substituents X, Y, Z here must be a hydrolyzable group, preferably a $C_1$ to $C_8$ alkoxy or a $C_1$ to $C_8$ acyloxy group, wherein the substituents X, Y and Z are directly bound with the Si atom or the two of the substituents X, Y, Z form a ring together with the Si atom to which they are bound. In preferred embodiments, X, Y and Z are the substituents directly bound with the SI atom. As hydrolyzable groups, preferably alkoxy groups, in particular methoxy, ethoxy, i-propyloxy and i-butyloxy groups, are selected. This is advantageous, since no substances which irritate mucous membranes are released during the curing of compositions comprising alkoxy groups. The alcohols formed by hydrolysis of the residues are harmless in the quantities released, and evaporate. These compositions are therefore suitable in particular for the DIY sector. However, acyloxy groups, such as an acetoxy group —O—CO—CH$_3$, can also be used as hydrolyzable groups.

In preferred embodiments, the alkoxy- and/or acyloxysilane-terminated polymer(s) has/have at least two terminal groups of the general formula (I). Each polymer chain thus comprises at least two linking points at which the condensation of the polymers can be completed, splitting off the hydrolyzed residues in the presence of atmospheric moisture. In this way, regular and rapid crosslinkability is achieved so that bonds with good strengths can be obtained. In addition, by means of the quantity and the structure of the hydrolyzable groups—for example by using di- or trialkoxysilyl groups, methoxy groups or longer residues—the configuration of the network that can be achieved as a long-chain system (thermoplastics), relatively wide-mesh three-dimensional network (elastomers) or highly crosslinked system (thermosets) can be controlled, so that inter alia the elasticity, flexibility and heat resistance of the finished crosslinked compositions can be influenced in this way.

In preferred embodiments, in the general formula (I), X is preferably an alkyl group and Y and Z are, each independently of one another, an alkoxy group, or X, Y and Z are, each independently of one another, an alkoxy group. In general, polymers comprising di- or trialkoxysilyl groups have highly reactive linking points which permit rapid curing, high degrees of crosslinking and thus good final strengths. The particular advantage of dialkoxysilyl groups lies in the fact that, after curing, the corresponding compositions are more elastic, softer and more flexible than systems comprising trialkoxysilyl groups. They are therefore suitable in particular for use as sealants. In addition, they split off even less alcohol during curing and are therefore of particular interest when the quantity of alcohol released is to be reduced.

With trialkoxysilyl groups, on the other hand, a higher degree of crosslinking can be achieved, which is particularly advantageous if a harder, stronger material is desired after curing. In addition, trialkoxysilyl groups are more reactive and therefore crosslink more rapidly, thus reducing the quantity of catalyst required, and they have advantages in "cold flow"—the dimensional stability of a corresponding adhesive under the influence of force and possibly temperature.

Particularly preferably, the substituents X, Y and Z in the general formula (I) are, each independently of one another, selected from a hydroxyl, a methyl, an ethyl, a methoxy or an ethoxy group, at least one of the substituents being a hydroxyl group, or a methoxy or an ethoxy group, preferably a methoxy group. Methoxy and ethoxy groups as comparatively small hydrolyzable groups with low steric bulk are very reactive and thus permit a rapid cure, even with low use of catalyst. They are therefore of particular interest for systems in which rapid curing is desirable, such as for example in adhesives with which high initial adhesion is required.

Interesting configuration possibilities are also opened up by combinations of the two groups. If, for example, methoxy is selected for X and ethoxy for Y within the same alkoxysilyl group, the desired reactivity of the terminating silyl groups can be adjusted particularly finely if silyl groups carrying exclusively methoxy groups are deemed too reactive and silyl groups carrying ethoxy groups not reactive enough for the intended use.

In addition to methoxy and ethoxy groups, it is of course also possible to use larger residues as hydrolyzable groups, which by nature exhibit lower reactivity. This is of particular interest if delayed curing is also to be achieved by means of the configuration of the alkoxy groups.

The total proportion of the polymers with at least one silicone-containing group, preferably at least one end group, of the general formula (I) in the composition according to the invention is preferably 10 to 80 wt. %, more preferably 10 to 60 wt. %, most preferably 20 to 60 wt. %, based in each case on the total weight of the curable composition.

The curable composition according to the invention comprises as an additional component at least one compound of the general formula (II)

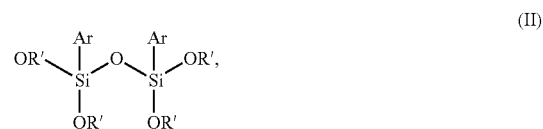

wherein R' is same or different and is, independently from one another, selected from the group consisting of a hydrogen atom and hydrocarbon residues having 1 to 12 carbon atoms, and Ar is selected from aryl groups. In preferred embodiments, the aryl group is a phenyl group and/or R' in the general formula (II) is selected from a methyl or ethyl group, more preferably a methyl group. The most preferred is diphenyltetramethoxydisiloxane.

It has been shown that, when using the at least one compound of the general formula (II) above, the curable compositions according to the invention have an improved tensile strength and elongation.

The proportion of compound of the general formula (II) in the curable composition according to the invention is preferably 1 to 60 wt. %, more preferably 2 to 50 wt. % based on the total weight of the composition.

In preferred embodiments, the curable composition according to the invention comprises at least one compound of the general formula (II) in an amount of 20 to 60 wt. %, more preferably 20 to 50 wt. %, most preferably 30 to 50 wt. % based on the total weight of the composition.

In alternatively preferred embodiments, the curable composition according to the invention comprises at least one compound of the general formula (II) in an amount of 1 to 50 wt. %, more preferably 2 to 40 wt. %, most preferably 4 to 30 wt. % based on the total weight of the composition.

The curable composition according to the invention may further comprise at least one silicone oligomer of the general formula (III)

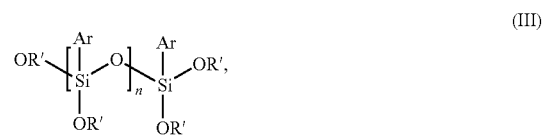

wherein R' is same or different and is, independently from one another, selected from the group consisting of a hydrogen atom and hydrocarbon residues having 1 to 12 carbon atoms, preferably a methyl or ethyl group, more preferably a methyl group, Ar is selected from aryl groups, preferably a phenyl group, and n is an integer selected from 2 to 10, preferably 2 to 4, more preferably 2 to 3, most preferably 3.

The composition according to the invention may comprise further ingredients in addition to the components mentioned hitherto, which can contribute to the expression of desired properties. Thus, it may be necessary to add one or more plasticizers to adjust the elastic properties and to improve the processability of the composition. A plasticizer is understood to be a substance which reduces the viscosity of the composition and thus makes processing easier, and in addition improves flexibility and extensibility of the compositions.

The plasticizer is preferably selected from a fatty acid ester, a dicarboxylic acid ester (except cyclohexanedicarboxylic acid dialkyl ester), an ester of epoxidized fatty acids or fatty acids carrying OH groups, a fat, a glycolic acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer and a chlorinated paraffin, and mixtures of two or more thereof. By the careful selection of one of these plasticizers or of a specific combination, further advantageous properties of the composition according to the invention, for example gelling properties of the polymers, low-temperature elasticity or low-temperature resistance or antistatic properties, can be achieved.

Among the polyether plasticizers, preferably end-capped polyethylene glycols are used, for example polyethylene or polypropylene glycol di-$C_{1-4}$-alkyl ethers, in particular the dimethyl or diethyl ethers of diethylene glycol or dipropylene glycol, and mixtures of two or more thereof. Also suitable as plasticizers are, for example, esters of abietic acid, butyric acid ester, acetic acid ester, propionic acid ester, thiobutyric acid ester, citric acid ester and esters based on nitrocellulose and polyvinyl acetate, as well as mixtures of two or more thereof. Also suitable are, for example, the asymmetrical esters of adipic acid monooctyl ester with 2-ethylhexanol (Edenol DOA, Cognis Deutschland GmbH, Düsseldorf). In addition, the pure or mixed ethers of monofunctional, linear or branched $C_{4-16}$ alcohols or mixtures of two or more different ethers of such alcohols are suitable as plasticizers, for example dioctyl ether (available as Cetiol OE, Cognis Deutschland GmbH, Düsseldorf). Likewise suitable as plasticizers within the framework of the present invention are diurethanes, which can be produced e.g. by reaction of diols having OH end groups with monofunctional isocyanates, by selecting the stoichiometry so that substantially all free OH groups react fully. Any excess isocyanate can then be removed from the reaction mixture, e.g. by distillation. Another method for producing diurethanes consists in the reaction of monofunctional alcohols with diisocyanates, wherein as far as possible all NCO groups react fully.

In principle, phthalic acid esters can also be used as plasticizers, but because of their toxicological potential these are not preferred.

The total quantity of plasticizer(s) in curable compositions according to the invention is for preference 1 to 30 wt. %, preferably 5 to 25 wt. % and particularly preferably 10 to 20 wt. %, based in each case on the total weight of the curable composition.

Too high a viscosity of the composition according to the invention for certain applications can also be reduced in a simple and useful manner by using a reactive diluent, without signs of separation (e.g. plasticizer migration) appearing in the cured material. The reactive diluent preferably has at least one functional group which reacts with e.g. moisture or atmospheric oxygen after application. Examples of these groups are silyl groups, isocyanate groups, vinylically unsaturated groups and polyunsaturated systems. As reactive diluent, it is possible to use any compounds which are miscible with the composition according to the invention with a reduction of the viscosity and have at least one group that is reactive with the binder, individually or as a combination of several compounds. The viscosity of the reactive diluent is preferably less than 20,000 mPas, particularly preferably about 0.1-6000 mPas, most particularly preferably 1-1000 mPas (Brookfield RVT, 23° C., spindle 7, 10 rpm).

As reactive diluents it is possible to use for example the following substances: polyalkylene glycols reacted with isocyanatosilanes (for example Synalox 100-50B, DOW), alkyltrimethoxysilane, alkyltriethoxysilane, such as methyltrimethoxysilane, methyltriethoxysilane and vinyltrimethoxysilane (XL 10, Wacker), phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methylcarbamate (XL63, Wacker), N-dimethoxy(methyOsilylmethyl-O-methylcarbamate (XL65, Wacker), hexadecyltrimethoxysilane, 3-octanoylthio-1-propyltriethoxysilane and partial hydrolyzates of these compounds. Furthermore, the following polymers from Kaneka Corp. can also be used as reactive diluents: MS S203H, MS S303H, MS SAT 010 and MS SAX 350. Also suitable as reactive diluents are polymers which can be produced from an organic backbone by grafting with a vinylsilane or by reaction of polyol, polyisocyanate and alkoxysilane.

Suitable as polyols for producing a reactive diluent are e.g. aliphatic alcohols include, for example, ethylene glycol, propylene glycol and higher glycols, as well as other polyfunctional alcohols. The polyols can additionally comprise other functional groups, such as e.g. esters, carbonates, amides. To produce a reactive diluent by reaction of polyol with polyisocyanate and alkoxysilane, the corresponding polyol component is reacted in each case with an at least difunctional isocyanate. Suitable as the at least difunctional isocyanate is in principle any isocyanate having at least two isocyanate groups, but within the framework of the present invention, compounds having two to four isocyanate groups, in particular two isocyanate groups, are generally preferred. Among the alkoxysilyl groups, the di- and trialkoxysilyl groups are preferred.

The polyisocyanates described above for producing polyurethanes are also suitable as polyisocyanates for producing a reactive diluent.

To reduce the viscosity of the composition according to the invention, solvents can also be used as well as or instead of a reactive diluent. Suitable as solvents are aliphatic or aromatic hydrocarbons, halogenated hydrocarbons, alcohols, ketones, ethers, esters, ester alcohols, keto alcohols, keto ethers, keto esters and ether esters. Preferably, however, alcohols are used since in this case the storage stability increases. $C_1$-$C_{10}$ alcohols are particularly preferred, particularly methanol, ethanol, i-propanol, isoamyl alcohol and hexanol.

The composition according to the invention can additionally comprise an adhesion promoter. An adhesion promoter is understood to be a substance which improves the adhesion properties of adhesive layers on surfaces. It is possible to use conventional adhesion promoters known to the person skilled in the art (tackifiers) individually or as a combination of several compounds. Suitable examples are resins, terpene oligomers, coumarone/indene resins, aliphatic, petrochemical resins and modified phenolic resins. Suitable within the framework of the present invention are, for example, hydrocarbon resins, as obtained by polymerization of terpenes, principally α- or β-pinene, dipentene or limonene. The polymerization of these monomers generally takes place cationically with initiation by Friedel-Crafts catalysts. The terpene resins also include copolymers of terpenes and other monomers, e.g. styrene, α-methylstyrene, isoprene and the like. The above resins are used e.g. as adhesion promoters for pressure-sensitive adhesives and coating materials. Also suitable are the terpene-phenolic resins which are produced by acid-catalyzed addition of phenols to terpenes or rosin. Terpene-phenolic resins are soluble in most organic solvents and oils and are miscible with other resins, waxes and rubber. Likewise within the framework of the present invention, the rosins and derivatives thereof, for example their esters or alcohols, are suitable as adhesion promoters in the above sense. Silane adhesion promoters, in particular aminosilanes, are particularly suitable.

In a special embodiment of the curable composition according to the invention, the composition encompasses a silane of the general formula (IV)

$$R^{1'}R^{2'}N-R^{3'}-SiXYZ \quad (IV)$$

as adhesion promoter, wherein $R^{1'}$ and $R^{2'}$ are, independently of one another, a hydrogen or C1 to C8 alkyl residues, $R3'$ is a divalent hydrocarbon residue having 1 to 12 carbon atoms, optionally comprising a heteroatom, and X, Y, Z are, each independently of one another, selected from a hydroxyl group or C1 to C8 alkyl, C1 to C8 alkoxy or C1 to C8 acyloxy groups, at least one of the substituents X, Y, Z being a C1 to C8 alkoxy or C1 to C8 acyloxy group. Compounds of this type naturally exhibit a high affinity to the binding polymer components of the curable composition according to the invention, but also to a wide range of polar and nonpolar surfaces, and therefore contribute to the formation of a particularly stable bond between the adhesive composition and the particular substrates to be bonded.

The linking group $R^{3'}$ can, for example, be a linear, branched or cyclic, substituted or unsubstituted alkylene residue. Nitrogen (N) or oxygen (O) may be contained therein as a heteroatom. If X, Y and/or Z are an acyloxy group, this can be e.g., the acetoxy group —OCO—CH$_3$.

One or more adhesion promoter(s) is/are preferably contained in the curable composition according to the invention in a quantity of 0.1 to 5 wt. %, more preferably 0.2 to 2 wt. %, in particular 0.3 to 1 wt. %, based in each case on the total weight of the composition.

The composition according to the invention may additionally comprise at least one filler, e.g., selected from chalk, powdered limestone, precipitated and/or pyrogenic silica, zeolites, bentonites, magnesium carbonate, kieselguhr, alumina, clay, tallow, titanium oxide, iron oxide, zinc oxide, sand, quartz, flint, mica, powdered glass and other ground minerals. In preferred embodiments, the filler(s) are precipitated and/or pyrogenic silica. Furthermore, organic fillers can also be used, in particular carbon black, graphite, wood fibers, wood flour, sawdust, cellulose, cotton, pulp, wood chips, chopped straw, chaff, ground walnut shells and other short-cut fibers. Furthermore, short fibers such as glass fibers, glass filament, polyacrylonitrile, carbon fibers, Kevlar fibers or polyethylene fibers can also be added. Aluminum powder is also suitable as a filler. In addition, hollow spheres with a mineral shell or a plastic shell are suitable as fillers. These can be e.g. hollow glass spheres which are commercially available with the trade names Glass Bubbles®. Plastic-based hollow spheres are commercially available, e.g. with the names Expancel® or Dualite®.

These are composed of inorganic or organic substances, each with a diameter of 1 mm or less, preferably of 500 μm or less. For some applications, fillers which make the preparations thixotropic are preferred. These fillers are also described as rheological auxiliaries, for example hydrogenated castor oil, fatty acid amides or swellable plastics such as PVC. So that they can easily be squeezed out of a suitable metering device (e.g. tube), these preparations possess a viscosity of 3000 to 15,000, preferably 4000 to 8,000 mPas or 5000 to 6000 mPas.

The filler(s) are preferably used in a quantity of 10 to 70 wt. %, more preferably 20 to 60 wt. %, for example 25 to 55 wt. %, in particular 35 to 50 wt. %, based on the total weight of the composition according to the invention. An individual filler or a combination of several fillers can be used.

For example, a highly disperse silica with a BET surface area of 10 to 500 m$^2$/g is used as a filler. The use of such a silica does not bring about a substantial increase in the viscosity of the composition according to the invention but contributes to reinforcing the hardened preparation. By means of this reinforcement, for example the initial strengths, tensile shear strengths and the adhesion of the adhesives, sealants or coating compositions in which the composition according to the invention is used are improved. Preferably, uncoated silicas with a BET surface area of less than 100, more preferably less than 65 m$^2$/g, and/or coated silicas with a BET surface area of 100 to 400, more preferably 100 to 300, in particular 150 to 300 and most particularly preferably 200 to 300 m$^2$/g, are used.

As zeolites, preferably alkali aluminosilicates are used, for example sodium-potassium aluminosilicates of the general empirical formula aK$_2$O*bNa$_2$O*Al$_2$O$_3$*2SiO*nH$_2$O with 0<a, b<1 and a+b=1. The pore opening of the zeolite or zeolites used is just large enough to accept water molecules. Accordingly, an effective pore opening of the zeolites of less than 0.4 nm is preferred. Particularly preferably, the effective pore opening is 0.3 nm±0.02 nm. The zeolite(s) is/are preferably used in the form of a powder.

Chalk is preferably used as a filler. Cubic, non-cubic, amorphous and other modifications of calcium carbonate can be used as chalk. Preferably, the chalks used are surface treated or coated. As a coating agent, preferably fatty acids, fatty acid soaps and fatty acid esters are used, for example lauric acid, palmitic acid or stearic acid, sodium or potassium salts of such acids or their alkyl esters. In addition, however, other surface-active substances, such as sulfate esters of long-chain alcohols or alkylbenzenesulfonic acids or their sodium or potassium salts or coupling reagents based on silanes or titanates, are also suitable. The surface treatment of chalks is often associated with an improvement in processability and adhesive strength and also the weathering resistance of the compositions. The coating composition is usually used in a proportion of 0.1 to 20 wt. %, preferably 1 to 5 wt. %, based on the total weight of the crude chalk.

Depending on the desired property profile, precipitated or ground chalks or mixtures thereof can be used. Ground chalks can be produced, for example, from natural lime, limestone or marble by mechanical grinding, using either dry or wet methods. Depending on the grinding method, fractions having different average particle sizes can be obtained. Advantageous specific surface area values (BET) are between 1.5 m$^2$/g and 50 m$^2$/g.

The composition according to the invention can additionally comprise UV stabilizers. Preferably, the proportion of the UV stabilizers in the composition according to the invention is up to about 2 wt. %, in particular up to 1 wt. %.

Particularly suitable as UV stabilizers are the so-called hindered amine light stabilizers (HALS). For example, a UV stabilizer can be used which carries a silyl group and is incorporated into the end product during crosslinking or curing. Furthermore, benzotriazoles, benzophenones, benzoates, cyanoacrylates, acrylates, sterically hindered phenols, phosphorus and/or sulfur can also be added. The curable composition according to the invention preferably comprises at least one bis(piperidyl) dicarboxylic acid diester, for example bis(2,2,6,6-tetramethyl-4-piperidyl) sebacate.

It is often useful to stabilize the composition according to the invention further against moisture penetration in order to increase the shelf life even more. Such an improvement in shelf life can be achieved, for example, by the use of drying agents. Suitable as drying agent are all compounds that react with water to form a group that is inert towards the reactive groups present in the composition while undergoing the smallest possible changes in their molecular weight. Furthermore, the reactivity of the drying agents towards moisture that has penetrated into the composition must be higher than the reactivity of the end groups of the silyl group-containing polymer according to the invention present in the composition. Isocyanates, for example, are suitable as drying agent.

Advantageously, silanes are also used as drying agent, e.g. vinylsilanes such as 3-vinylpropyltriethoxysilane, oxime silanes such as methyl-O,O',O"-butan-2-one trioximosilane or O,O',O",O'''-butan-2-one tetraoximosilane (CAS no. 022984-54-9 and 034206-40-1) or benzamidosilanes such as bis(N-methylbenzamido)methylethoxysilane (CAS no. 16230-35-6) or carbamatosilanes such as carbamatomethyltrimethoxysilane. However, the use of methyl-, ethyl- or vinyltrimethoxysilane, tetramethyl- or tetraethylethoxysilane is also possible. Particularly preferred here are vinyltrimethoxysilane and tetraethoxysilane in terms of efficiency and costs. Also suitable as drying agent are the above-mentioned reactive diluents, provided that they have a molecular weight ($M_n$) of less than about 5,000 g/mol and terminal groups whose reactivity with penetrating moisture is at least as great as, preferably greater than, the reactivity of the reactive groups of the silyl group-containing polymer according to the invention. Finally, alkyl orthoformates or orthoacetates can also be used as drying agent, for example methyl or ethyl orthoformate or methyl or ethyl orthoacetate. Generally, the composition according to the invention preferably comprises 0.01 to 10 wt. % drying agent, based on the total weight of the composition.

The curable composition according to the invention preferably comprises the following components in the stated proportions by weight:
at least one polymer having at least one terminal group

| | |
|---|---|
| of the general formula (I) | 10 to 60 wt. %, |
| at least one compound of the general formula (II) | 1 to 60 wt. %, |
| at least one filler | 10 to 70 wt. %, |
| at least one plasticizer | 1 to 30 wt. %, |
| one or more auxiliary substance(s) | 0 to 15 wt. %, | wherein the proportions by weight add up to 100 wt. % and the proportions by weight are based on the total weight of the curable composition.

The term "auxiliary substances" covers components that are present in minor quantities, for example curing catalysts, adhesion promoters, water scavengers, UV stabilizers, anti-ageing agents, rheological auxiliaries, pigments or pigment pastes, fungicides, flame retardants and/or solvents.

With regard to the preferred representatives of the individual components and the preferably used quantities thereof, the statements made above in the description of the respective components apply.

The production of the composition according to the invention takes place by known methods by intimate mixing of the components in suitable dispersing apparatus, for example a high-speed mixer.

The present invention also provides adhesive, sealant, or coating materials comprising the curable composition according to invention and use of the curable composition according to the invention as an adhesive, sealant and/or coating material.

In principle, in the present invention, all features mentioned in the context of the present text, in particular the embodiments, ranges of proportions, components and other features of the composition according to the invention and of the uses according to the invention shown as preferred and/or special can be implemented in all possible and not mutually exclusive combinations, with combinations of features shown as preferred and/or special also being regarded as preferred and/or special.

EXAMPLES

Synthesis of Diphenyltetramethoxydisiloxane

Phenyltrimethoxysilane (195.2 g) was placed in a 3 neck round bottom flask (0.5 L) equipped with a magnetic stirring bar a thermometer and a dropping funnel. 1 N Hydrochloric acid (8.8 g with a molar ratio of water:methoxy 6:1) was added dropwise to the silane over a period of 7 h, whereby the temperature of the mixture was not allowed to exceed 40° C. The mixture was left stirring at 600 RPM for 10 h after which the reaction was stopped and the mixture stored at 25° C. for at least one day prior distillation. Conversion of the reaction after removal of the starting materials was 76%. Purification of the reaction mixture occurred via vacuum distillation. At a vacuum of 1 mbar two fractions were isolated. The first fraction came at 130° C. and contained unreacted phenyltrimethoxysilane. The second fraction was isolated at 230° C. and contained the desired product 1,2-diphenyltetramethoxydisiloxane (36% yield).

General Procedure for Manufacturing the Polymers

Polymer 1 (gamma-silane-terminated polymer): 282 g (15 mmol) of polypropylene glycol 18000 (hydroxyl value=6.0) was dried in a 500 ml three-neck flask at 80-90° C. under vacuum. Under a nitrogen atmosphere at 80° C., 0.1 g of dibutyltin laurate was added, and 7.2 g (32 mmol) 3-isocyanatopropyltrimethoxysilane (% NCO=18.4) was then added to it. After stirring for one hour at 80° C., the resulting polymer was cooled. After adding 3 g light stabilizer (Tinuvin 770 DF) and 6 g Geniosil XL 10 to the reactor while stirring and homogenizing for 10-30 minutes at 80° C., the resulting polymer was stored in a moisture-proof glass vessel under a nitrogen atmosphere before being processed further into a curable composition.

Polymer 2 (gamma-silane-terminated polymer): 384.02 g (33.88 mmol) of polypropylene ether polyol (Acclaim 12200, hydroxyl value=9.90) was dried in a 500 ml three-necked flask at 80-90° C. under vacuum. Under a nitrogen atmosphere, 0.1 g of dioctyltin dilaurate (TIB Kat 216) was added with stirring. Then, 15.19 g (68.33 mmol) of IPDI was added (NCO/OH ratio=2.02) with stirring. The mixture was left for one hour at 80-90° C. The conversion was accomplished with NCO monitoring, and as soon as the theoretical NCO value of the prepolymer had been reached titrimetrically (% NCO<0.75), 17.09 g (72.60 mmol) of N-(3-(Trimethoxysilyl)propyl)butylamine (Dynasylan 1189) was added with stirring and the mixture was left for half an hour at 80-90° C. (% NCO=0.00). A linear polymer was obtained. After adding 6.47 g light stabilizer (Tinuvin 770 DF) and 8.63 g Geniosil XL 10 to the reactor while stirring and homogenizing for 10-30 minutes at 80° C., the resulting polymer was stored in a moisture-proof glass vessel under a nitrogen atmosphere before being processed further into a curable composition.

Test Method for Determining Tensile Strength and Elongation at Break

Tensile strength and elongation at break were determined according to DIN 53504. Dumbbell specimens with the following dimensions were used: thickness 2+/−0.2 mm; bar width 10+/−0.5 mm; bar length approx. 45 mm; and total length 9 cm.

Procedure: the prepolymer mixture (formulation) was spread on an even surface forming a film with a thickness of 2 mm. The film was allowed to cure under normal conditions (23+/−2° C., relative humidity 50+/−5%) for 7 days, and then the dumbbell specimen was punched out. Three specimens were used for each determination. The test was carried out under normal conditions (23+/−2° C., relative humidity 50+/−5%) and the measurement was carried out after 7 days of curing. The test specimens have to be at the same temperature at which the measurement will take place. Before the measurement, the thickness of the test specimens is determined at least at three different positions, at the middle and at the extremes, with a caliper. The mean value is introduced in the measuring software. The test specimens are clamped into the tensile tester so that the longitudinal axis coincides with the mechanical axis of the tensile tester and comprises the largest possible surface of the rod heads, without clamping the middle bar. Then the dumbbell is stretched to <0.1 MPa with a rate of 50 mm/min. Then, the force-elongation curve is recorded with a line speed of 50 mm/min.

Evaluation: The following values are determined—breaking force in [N/mm$^2$] and elongation at break in [%].

Example 1

A polyether-based alpha-silane-terminated polymer (Geniosil STP-E30, Wacker), diphenyltetramethoxydisiloxane and N-(2-Aminoethyl)-3-aminopropyltrimethoxysilane (Geniosil GF 91, Wacker) were mixed together in the speedmixer for 30 s at a speed of 2750 U/min. The catalyst TIP Kat 216 was then added and the mixture was stirred again in the speedmixer for additional 30 s at a speed of 2750 U/min. The formulations described in Table 1 below were then left to cure at normal conditions for 7 days and tested for mechanical properties.

TABLE 1

Formulations of 1A to 1D and test results

|  | 1A | 1B | 1C | 1D |
| --- | --- | --- | --- | --- |
| Geniosil STP-E30 (wt. %) | 98.6 | 88.6 | 58.6 | 48.6 |
| Geniosil GF 91 (wt. %) | 1.0 | 1.0 | 1.0 | 1.0 |
| TIP Kat 216 (wt. %) | 0.4 | 0.4 | 0.4 | 0.4 |
| diphenyltetramethoxydisiloxane (wt. %) |  | 10.0 | 40.0 | 50.0 |
| Tensile Strength at break [N/mm$^2$] | 0.73 | 0.64 | 3.72 | 5.16 |
| Elongation (%) | 106 | 136 | 375 | 401 |

Example 1A is a comparative example.
Examples 1B to 1D are according to the invention.

Example 2

Polymer 1 obtained according to the above procedure, diphenyltetramethoxydisiloxane or divinyltetramethoxydisiloxane, and N-(2-Aminoethyl)-3-aminopropyltrimethoxysilane (Geniosil GF 91, Wacker) were mixed together in the speedmixer for 30 s at a speed of 2750 U/min. The catalyst TIP Kat 216 was then added and the mixture was stirred again in the speedmixer for additional 30 s at a speed of 2750 U/min. The formulations described in Table 2 below were then left to cure at normal conditions for 7 days and tested for mechanical properties.

TABLE 2

Formulations of 2A to 2G and test results

|  | 2A | 2B | 2C | 2D | 2E | 2F | 2G | 2H |
| --- | --- | --- | --- | --- | --- | --- | --- | --- |
| Polymer 1 (wt. %) | 98.6 | 88.6 | 78.6 | 68.6 | 58.6 | 48.6 | 38.6 | 58.6 |
| Geniosil GF 91 (wt. %) | 1.00 | 1.00 | 1.00 | 1.00 | 1.00 | 1.00 | 1.00 | 1.00 |
| TIP Kat 216 (wt. %) | 0.40 | 0.40 | 0.40 | 0.40 | 0.40 | 0.40 | 0.40 | 0.40 |
| diphenyltetramethoxydisiloxane (wt. %) |  | 10.0 | 20.0 | 30.0 | 40.0 | 50.0 | 60.0 |  |
| divinyltetramethoxydisiloxane (wt. %) |  |  |  |  |  |  |  | 40.0 |
| Tensile Strength at break [N/mm$^2$] | 0.71 | 0.78 | 0.94 | 3.07 | 6.81 | 8.06 | 6.41 | 0.09 |
| Elongation (%) | 71 | 77 | 85 | 265 | 383 | 588 | 339 | 4 |

Examples 2A are 2H are comparative example.
Examples 2B to 2G are according to the invention.

Example 3

Polymer 2 obtained according to the above procedure, diphenyltetramethoxydisiloxane and N-(2-Aminoethyl)-3-aminopropyltrimethoxysilane (Geniosil GF 91, Wacker) were mixed together in the speedmixer for 30 s at a speed of 2750 U/min. The catalyst TIP Kat 216 was then added and the mixture is stirred again in the speedmixer for additional 30 s at a speed of 2750 U/min. The formulations described in Table 3 below were then left to cure at normal conditions for 7 days and tested for mechanical properties.

TABLE 3

Formulations of 3A and 3B and test results

| | 3A | 3B |
|---|---|---|
| Polymer 2(wt. %) | 98.60 | 58.60 |
| Geniosil GF 91 (wt. %) | 1.00 | 1.00 |
| TIP Kat 216 (wt. %) | 0.40 | 0.40 |
| diphenyltetramethoxydisiloxane (wt. %) | | 40.00 |
| Tensile Strength at break [N/mm$^2$] | 0.86 | 7.75 |
| Elongation (%) | 65 | 411 |

Example 3A is a comparative example.
Example 3B is according to the invention.

Examples 4 and 5

Polymer 1 obtained according to the above procedure, silica gel HDK 20 (Wacker), diphenyltetramethoxydisiloxane, 3-aminopropyltrimethoxysilane (Geniosil GF 96, Wacker) and 3-methacryloxypropyltrimethoxysilane (Geniosil GF 31, Wacker) were mixed together in the speedmixer for 60 s at a speed of 3500 U/min. The catalyst TIP Kat 216 was then added and the mixture was stirred again in the speedmixer for additional 60 s at a speed of 3500 U/min. The formulations described in Tables 4 and 5 below were then left to cure at normal conditions for 7 days and tested for mechanical properties.

TABLE 4

Formulations of 4A to 4G and test results

| | 4A | 4B | 4C | 4D | 4E | 4F | 4G |
|---|---|---|---|---|---|---|---|
| Polymer 1 (wt. %) | 94.0 | 84.0 | 80.0 | 76.0 | 64.0 | 54.0 | 44.0 |
| HDK H20 (wt. %) | | 10.0 | 10.0 | 10.0 | 10.0 | 10.0 | 10.0 |
| Geniosil GF 96 (wt. %) | 1.60 | 1.60 | 1.60 | 1.60 | 1.60 | 1.60 | 1.60 |
| Geniosil GF 31 (wt. %) | 4.00 | 4.00 | 4.00 | 4.00 | 4.00 | 4.00 | 4.00 |
| TIP Kat 216 (wt. %) | 0.40 | 0.40 | 0.40 | 0.40 | 0.40 | 0.40 | 0.40 |
| diphenyltetramethoxy-disiloxane (wt. %) | | | 4.00 | 8.00 | 20.0 | 30.0 | 40.0 |
| Tensile Strength at break [N/mm$^2$] | 0.93 | 2.71 | 3.72 | 4.24 | 6.87 | 10.39 | 15.02 |
| Elongation (%) | 52 | 145 | 206 | 204 | 266 | 425 | 685 |

TABLE 5

Formulations of 5A to 5F and test results

| | 5A | 5B | 5C | 5D | 5E | 5F |
|---|---|---|---|---|---|---|
| Polymer 1 (wt. %) | 59.00 | 49.00 | 39.00 | 69.00 | 59.00 | 49.00 |
| HDK H20 (wt. %) | 15.00 | 15.00 | 15.00 | 5.00 | 5.00 | 5.00 |
| Geniosil GF 96 (wt. %) | 1.60 | 1.60 | 1.60 | 1.60 | 1.60 | 1.60 |
| Geniosil GF 31 (wt. %) | 4.00 | 4.00 | 4.00 | 4.00 | 4.00 | 4.00 |
| TIP Kat 216 (wt. %) | 0.40 | 0.40 | 0.40 | 0.40 | 0.40 | 0.40 |
| diphenyltetramethoxydisiloxane (wt. %) | 20.00 | 30.00 | 40.00 | 20.00 | 30.00 | 40.00 |
| Tensile Strength at break [N/mm$^2$] | 11.48 | 17.52 | 13.28 | 3.16 | 5.53 | 8.37 |
| Elongation (%) | 387 | 602 | 434 | 189 | 305 | 339 |

Examples 4A and 4B are comparative examples.
Examples 4C to 4G and 5A to 5F are according to the invention.

Example 6

Polymer 1 obtained according to the above procedure, silica gel Aerosil OX 50, various amounts of diphenyltetramethoxydisiloxane or phenyltrimethoxysilane and N-(2-Aminoethyl)-3-aminopropyltrimethoxysilane (Geniosil GF 91, Wacker) or a combination of 3-aminopropyltrimethoxysilane (Geniosil GF 96, Wacker) and 3-methacryloxypropyltrimethoxysilane (Geniosil GF 31, Wacker) were mixed together in the speedmixer for 60 s at a speed of 3500 U/min. The catalyst TIP Kat 216 was then added and the mixture was stirred again in the speedmixer for additional 60 s at a speed of 3500 U/min. The formulations described in Table 6 below were then left to cure at normal conditions for 7 days and tested for mechanical properties.

TABLE 6

Formulations of 6A to 6G and test results

|  | 6A | 6B | 6C | 6D | 6E | 6F | 6G |
|---|---|---|---|---|---|---|---|
| Polymer 1 (wt. %) | 84.00 | 84.00 | 82.00 | 80.00 | 76.00 | 76.00 | 44.00 |
| Aerosil OX 50 (wt. %) | 10.00 | 10.00 | 10.00 | 10.00 | 10.00 | 10.00 | 10.00 |
| Geniosil GF 91 (wt. %) | 5.60 |  | 5.60 | 5.60 | 5.60 |  |  |
| Geniosil GF 96 (wt. %) |  | 1.60 |  |  |  | 1.60 | 1.60 |
| Geniosil GF 31 (wt. %) |  | 4.00 |  |  |  | 4.00 | 4.00 |
| TIP Kat 216 (wt. %) | 0.40 | 0.40 | 0.40 | 0.40 | 0.40 | 0.40 | 0.40 |
| diphenyltetramethoxydisiloxane (wt. %) |  |  | 2.00 | 4.00 | 8.00 | 8.00 | 40.00 |
| Tensile Strength at break [N/mm²] | 1.57 | 1.51 | 2.06 | 1.98 | 2.07 | 1.91 | 7.29 |
| Elongation (%) | 102 | 114 | 152 | 151 | 158 | 128 | 279 |

Examples 6A and 6B are comparative examples.
Examples 6C to 6G are according to the invention.

The invention claimed is:

1. A curable composition comprising
a) at least one polymer having at least one terminal group of the general formula (I)

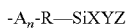  (I), wherein
A is a divalent bonding group containing at least one heteroatom,
R is selected from divalent hydrocarbon residues having 1 to 12 carbon atoms,
X, Y, Z are, each independently of one another, selected from the group consisting of a hydroxyl group and $C_1$ to $C_8$ alkyl, $C_1$ to $C_8$ alkoxy, and $C_1$ to $C_8$ acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting of a hydroxyl group, $C_1$ to $C_8$ alkoxy and $C_1$ to $C_8$ acyloxy groups, and n is 0 or 1; and
b) at least one compound of the general formula (II)

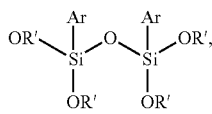  (II)

wherein each R' is the same or different and is, independently from one another, selected from the group consisting of a hydrogen atom and hydrocarbon residues having 1 to 12 carbon atoms, and each Ar is independently selected from aryl groups.

2. The curable composition according to claim 1, wherein the at least one polymer has at least two terminal groups of the general formula (I).

3. The curable composition according to claim 1, wherein each Ar in the general formula (II) is a phenyl group.

4. The curable composition according to claim 1, wherein R' in the general formula (II) is selected from a methyl or ethyl group.

5. The curable composition according to claim 1, wherein the composition comprises the at least one compound of the general formula (II) in an amount of 1 to 60 wt. % based on the total weight of the composition.

6. The curable composition according to claim 1, wherein the each divalent bonding group A in the general formula (I) is independently selected from an oxygen atom, a substituted or unsubstituted amide, a carbamate, a urethane, an urea, an amino, a carboxylate, a carbamoyl, an amidino, a carbonate, a sulfonate, a sulfinate or an —N(R")— group, wherein R" is selected from the group consisting of a hydrogen atom, an alkyl residue having 1 to 12 carbon atoms or an aryl residue having 1 to 12 carbon atoms.

7. The curable composition according to claim 1, wherein the substituents X, Y, Z in the general formula (I) are, each independently of one another, selected from a hydroxyl, a methyl, an ethyl, a methoxy, or an ethoxy group, wherein at least one of the substituents is a hydroxyl group, or a methoxy or an ethoxy group.

8. The curable composition according to claim 1, wherein R in the general formula (I) is selected from a methylene, ethylene, or n-propylene.

9. The curable composition according to claim 1, wherein the composition is a one component composition.

10. The curable composition according to claim 1, wherein the composition further comprises at least one filler.

11. The curable composition according to claim 1, wherein the composition further comprises at least one adhesion promoter and/or at least one catalyst.

12. Cured reaction products of the curable composition according to claim 1.

13. An adhesive, sealant, or coating material comprising the curable composition according to claim 1.

* * * * *

UNITED STATES PATENT AND TRADEMARK OFFICE
CERTIFICATE OF CORRECTION

PATENT NO. : 10,800,881 B2
APPLICATION NO. : 16/207447
DATED : October 13, 2020
INVENTOR(S) : Christina Despotopoulou et al.

Page 1 of 1

It is certified that error appears in the above-identified patent and that said Letters Patent is hereby corrected as shown below:

In the Specification

Column 10, Line 21 change "N-dimethoxy(methyOsilylmethyl-O-methylcarbamate (XL65, Wacker)" to --N-dimethoxy(methyl)silylmethyl-O-methylcarbamate (XL65, Wacker)--.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*